R. F. Loper,
Reciprocating Steam Engine,
Nº 4,289.                                        Patented Nov. 26, 1845.

UNITED STATES PATENT OFFICE.

R. F. LOPER, OF PHILADELPHIA, PENNSYLVANIA.

IMPROVEMENT IN STEAM-ENGINES.

Specification forming part of Letters Patent No. 4,289, dated November 26, 1845.

*To all whom it may concern:*

Be it known that I, R. F. LOPER, of the city and county of Philadelphia, and State of Pennsylvania, have invented a new and useful method of arranging the steam-engine to operate two parallel crank-shafts in opposite directions and with equal velocities with a single engine, principally intended for operating the Loper propellers and all others of that class; and I do hereby declare that the following is a full, clear, and exact description of the principle thereof, which distinguishes it from all other things before known, and of the manner of making, constructing, and using the same, reference being had to the accompanying drawings, making part of this specification, in which—

Figure 2:
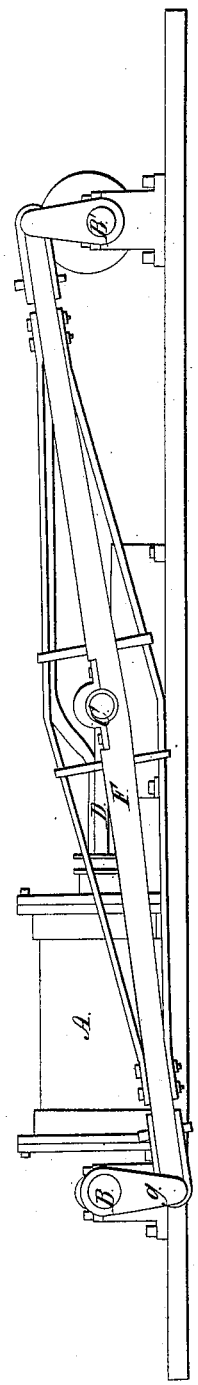
Figure 1:
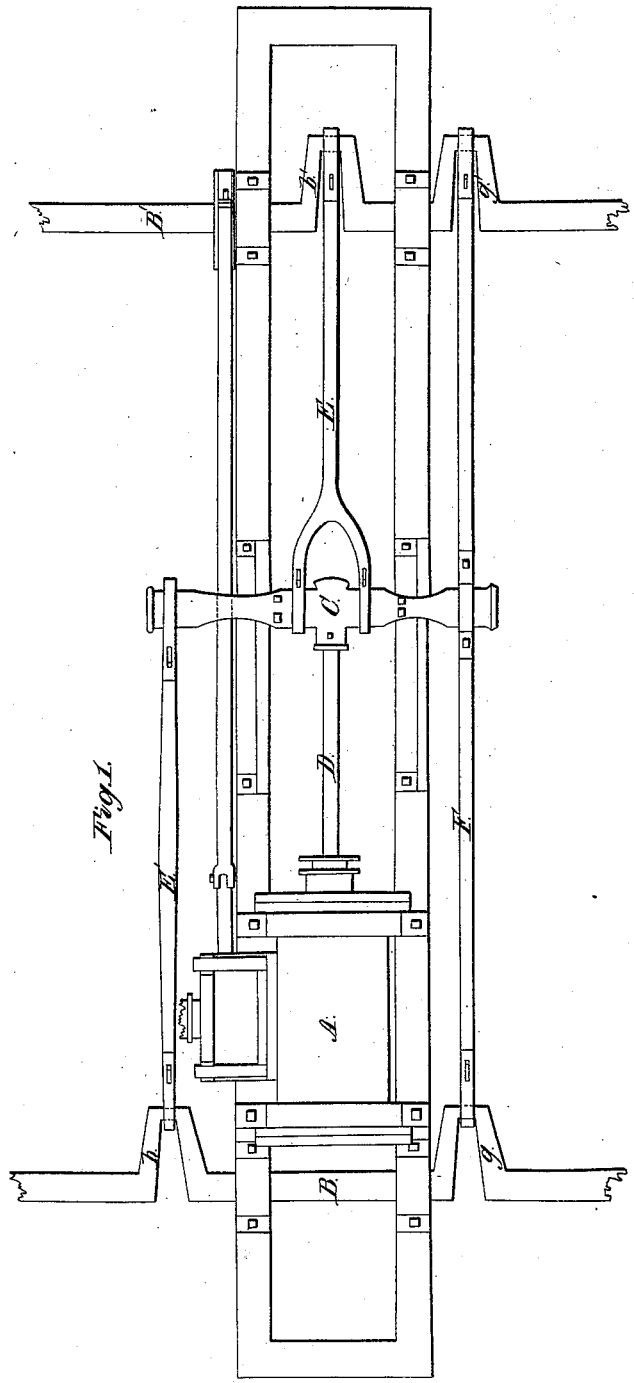

Figure 1 is a plan of the engine with the two parallel shafts, and Fig. 2 a longitudinal elevation.

The same letters indicate like parts in all the figures.

The nature of my invention consists in rotating two crank-shafts with equal velocities and in opposite directions by means of a connecting-rod extending from the cross-head of a steam-engine to the two crank-shafts, the center of vibration of the cross-head being centrally between them.

The engine A is horizontal and may be constructed in accordance with any of the known methods, and is placed between one of the crank-shafts B and the cross-head C, which is actuated by the piston-rod D. The cross-head C must be placed with its center of vibration midway between the two crank-shafts B B', to which it is connected by two connecting-rods, E E', the one, E, taking hold of the crank $b'$ on the shaft B' and on a line with the piston-rod, and the other, E', extending from the cross-head and passing along one side of the cylinder of the engine and taking hold of the crank $b$ on the shaft B. A connecting rod or lever, F, is placed parallel with the connecting-rod E' and on the opposite side of the cylinder, and connects the cross-head C with the two crank-shafts B B' by means of cranks $g g'$, and placed at one hundred and eighty degrees with each other when the engine is at half-stroke. It will be evident from this arrangement that the connecting rod or lever F being connected with the cross-head of the engine or to a reciprocating center of vibration that the crank-shafts cannot turn in the same direction without breaking some part of the connection, and that the two shafts must necessarily turn in opposite directions and with equal velocities.

Instead of employing the connecting rod or lever F in addition to the two connecting-rods E E', the two latter may be dispensed with and one similar to F substituted therefor and placed on the other side of the engine; or a single rod may be employed and placed in a line with the piston-rod D by branching one end in such manner as to embrace the cylinder and piston-rod and come together and take hold of its appropriate crank just beyond the end of the cylinder, as the leading object of my invention is to connect the cross-head of an engine with two crank-shafts on opposite sides by means of a vibrating connecting-rod, to insure the turning of the two shafts in opposite directions and with equal velocities.

What I claim as my invention, and desire to secure by Letters Patent, is—

Connecting the cross-head of a reciprocating engine with two crank-shafts on opposite sides of and at equal distances from its center of vibration by means of a connecting rod or lever turning on the cross-head and reciprocating with it and taking hold of the cranks on the two crank-shafts, by which they are caused to turn in opposite directions and with equal velocities, as herein described.

R. F. LOPER.

Witnesses:
  JNO. COOK,
  B. T. MCMURTRIE.